(12) United States Patent
Lintz et al.

(10) Patent No.: US 12,114,036 B2
(45) Date of Patent: *Oct. 8, 2024

(54) CACHING RECORDED CONTENT SEGMENTS ON PLAYBACK

(71) Applicant: Comcast Cable Communications, LLC, Philadelphia, PA (US)

(72) Inventors: Christopher Lintz, Denver, CO (US); Jeremy Pfeifer, Highlands Ranch, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 261 days.

This patent is subject to a terminal disclaimer.

(21) Appl. No.: 17/708,152

(22) Filed: Mar. 30, 2022

(65) Prior Publication Data

US 2022/0279235 A1 Sep. 1, 2022

Related U.S. Application Data

(63) Continuation of application No. 16/577,583, filed on Sep. 20, 2019, now Pat. No. 11,323,764.

(51) Int. Cl.
| | |
|---|---|
| *H04N 21/432* | (2011.01) |
| *H04N 21/4147* | (2011.01) |
| *H04N 21/433* | (2011.01) |
| *H04N 21/472* | (2011.01) |
| *H04N 21/61* | (2011.01) |

(52) U.S. Cl.
CPC ..... *H04N 21/4325* (2013.01); *H04N 21/4331* (2013.01); *H04N 21/4334* (2013.01); *H04N 21/47217* (2013.01); *H04N 21/4147* (2013.01); *H04N 21/6125* (2013.01)

(58) Field of Classification Search
None
See application file for complete search history.

(56) References Cited

U.S. PATENT DOCUMENTS

| | | | |
|---|---|---|---|
| 11,323,764 B2* | 5/2022 | Lintz | ............ H04N 21/23113 |
| 2010/0318632 A1 | 12/2010 | Yoo et al. | |
| 2016/0163355 A1 | 6/2016 | Hirabayashi et al. | |
| 2016/0286457 A1 | 9/2016 | O'Hare et al. | |
| 2017/0180825 A1 | 6/2017 | Lacivita et al. | |
| 2018/0014041 A1* | 1/2018 | Chen | ................. H04L 65/612 |
| 2019/0007756 A1 | 1/2019 | Navali et al. | |
| 2019/0174175 A1 | 6/2019 | Elbert et al. | |
| 2019/0327504 A1 | 10/2019 | Jindal et al. | |
| 2020/0374331 A1* | 11/2020 | Hudgin | ............... H04N 21/222 |
| 2021/0084110 A1 | 3/2021 | Knox et al. | |

OTHER PUBLICATIONS

US Patent Application filed on Sep. 20, 2019, entitled "Caching Recorded Content Segments on Playback", U.S. Appl. No. 16/577,583.

* cited by examiner

*Primary Examiner* — Junior O Mendoza
(74) *Attorney, Agent, or Firm* — BakerHostetler

(57) ABSTRACT

Methods and apparatus are disclosed for efficient storage and retrieval of content items, such as recorded content items of a cloud DVR system or other system storing content items.

41 Claims, 6 Drawing Sheets

CACHING RECORDED CONTENT SEGMENTS ON PLAYBACK

CROSS REFERENCE TO RELATED APPLICATIONS

This application is a continuation of U.S. patent application Ser. No. 16/577,583, filed Sep. 20, 2019, now U.S. Pat. No. 11,323,764, issued May 3, 2022, the contents of which is hereby incorporated by reference in its entirety.

BACKGROUND

Cloud-based digital video recorder (DVR) solutions move the functionality of a home DVR device to the cloud. Cloud DVRs function like traditional home DVRs, but they store recorded content in the service provider network (i.e., the cloud), eliminating the need for a physical DVR device in the home. With cloud DVR, recorded content may be streamed to a number of different playback devices via the service provider network.

Due to legal and regulatory requirements, cloud DVR systems must store individual copies of a recorded content item for each user who makes a personal copy, even though the recorded content item, such as a television program, may be virtually identical for each user. For example, if one hundred users all record the same television program broadcast at a particular time, the service provider's cloud DVR system must store one hundred individual copies of the recorded television program—one for each user. For service providers with large numbers of users, storage and retrieval of cloud DVR content can be challenging. Hence, there is a need for methods and apparatus for efficient storage and retrieval of cloud DVR content.

SUMMARY

Methods and apparatus are disclosed for efficient storage and retrieval of content items, such as recorded content items of a cloud DVR system or other system storing content items. The one or more content items may be stored in a storage. A content item may comprise a plurality of segments of content. The plurality of segments of content may be divided into a plurality of bundles, and each bundle of segments of the content item may be stored in the storage.

A request for a segment of a plurality of segments of a content item may be received from a playback device of a user. A determination may be made, based on the request, which of a plurality of bundles of segments of the content item contains the requested segment. The determined bundle may be retrieved from the storage. The retrieved bundle may be stored in a cache memory. The requested segment of the plurality of segments of the stored bundle may be sent to the playback device. The requested segment sent to the playback device may be deleted from the cache memory, whereas the remaining segments of the bundle may be maintained in the cache memory.

Another request may be received from the playback device for another segment of the plurality of segments of the retrieved bundle. In response to the another request, it may be determined whether the retrieved bundle is still stored in the cache memory. If so, the another segment may be retrieved from the cache memory, without again having to retrieve the determined bundle from the storage. The another requested segment retrieved from the cache memory may be sent to the playback device. The another requested segment sent to the playback device may also be deleted from the cache memory, whereas the remaining segments of the bundle may be maintained in the cache memory.

A linked list of the plurality of segments of the determined bundle may be created in the cache memory. Metadata associated with the determined bundle may be stored in the storage to facilitate creation of the linked list. The metadata may specify, for each of the plurality of segments of the determined bundle, an end of segment byte offset within the bundle. The linked list may be created based on the metadata.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION

Figure 1:
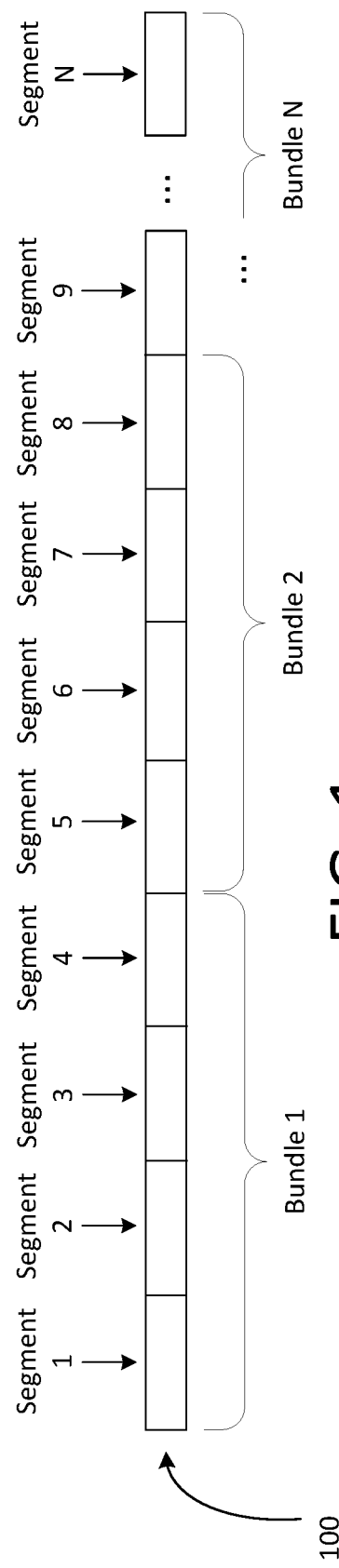
FIG. 1 illustrates an example content item.

FIG. 1 illustrates an example content item 100. In various instances, a content item may also be referred to as "content," "content data," "content information," "content asset," or simply "data" or "information"). In some instances, content items may comprise any information or data that a user is authorized to access. Content items may comprise electronic representations of video, audio, text and/or graphics, including but not limited to electronic representations of videos, movies, or other multimedia, including but not limited to data files adhering to MPEG2, MPEG, MPEG4 UHD, HDR, 4k, Adobe® Flash® Video (.FLV) format or some other video file format whether such format is presently known or developed in the future. Content items may comprise electronic representations of music, spoken words, or other audio, including but not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP) Sound Document (.ASND) format or some other format configured to store electronic audio whether such format is presently known or developed in the future. In some cases, content items may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may comprise any combination of the above-described examples.

With reference to FIG. 1, the example content item 100 may comprise a plurality of content item segments, such as segments 1, 2 . . . N as shown. Each content item segment may correspond to a portion of the content item, such as some duration of the content item. As an example, a segment may comprise a two second portion of the content item. In such an example, a thirty minute television content item may comprise nine hundred content item segments, each being about two seconds in duration. Segments may be shorter or longer than two seconds. Segments, when combined with multiple bitrates, may reduce strain on a service provider network and allow the service provider to connect to a larger customer base. For example, smaller content segments may allow the content provider to react quickly to changes in demand on the network.

There may be a manifest associated with the content item that provides an identifier, such as a uniform resource identifier (URI) or uniform resource locator (URL), for each content item segment. The identifier may be used by a playback device to request that a particular content item segment be transmitted to the playback device for playback on a display, monitor, television, or other presentation device.

A plurality of content segments may define a bundle of segments. The plurality of segments of a content item that form a bundle may be consecutive segments of the content asset. A bundle of content segments may comprise any number of content segments. For example, a bundle may comprise 2 segments, 4 segments, 8, segments, 12 segments, or some other number of segments. The content item may be partitioned into a plurality of equal size bundles. The content item may be partitioned into a plurality of bundles of different sizes. In the example of FIG. 1, a first bundle 1 may comprise segments 1-4, and a second bundle 2 may comprise segments 5-8, and so on. Partitioning the content item into bundles may facilitate efficient storage of the content item. For example, by storing the segments of a content item in bundles, a number of storage retrieval requests for the segments of a content item may be reduced.

Figure 2:
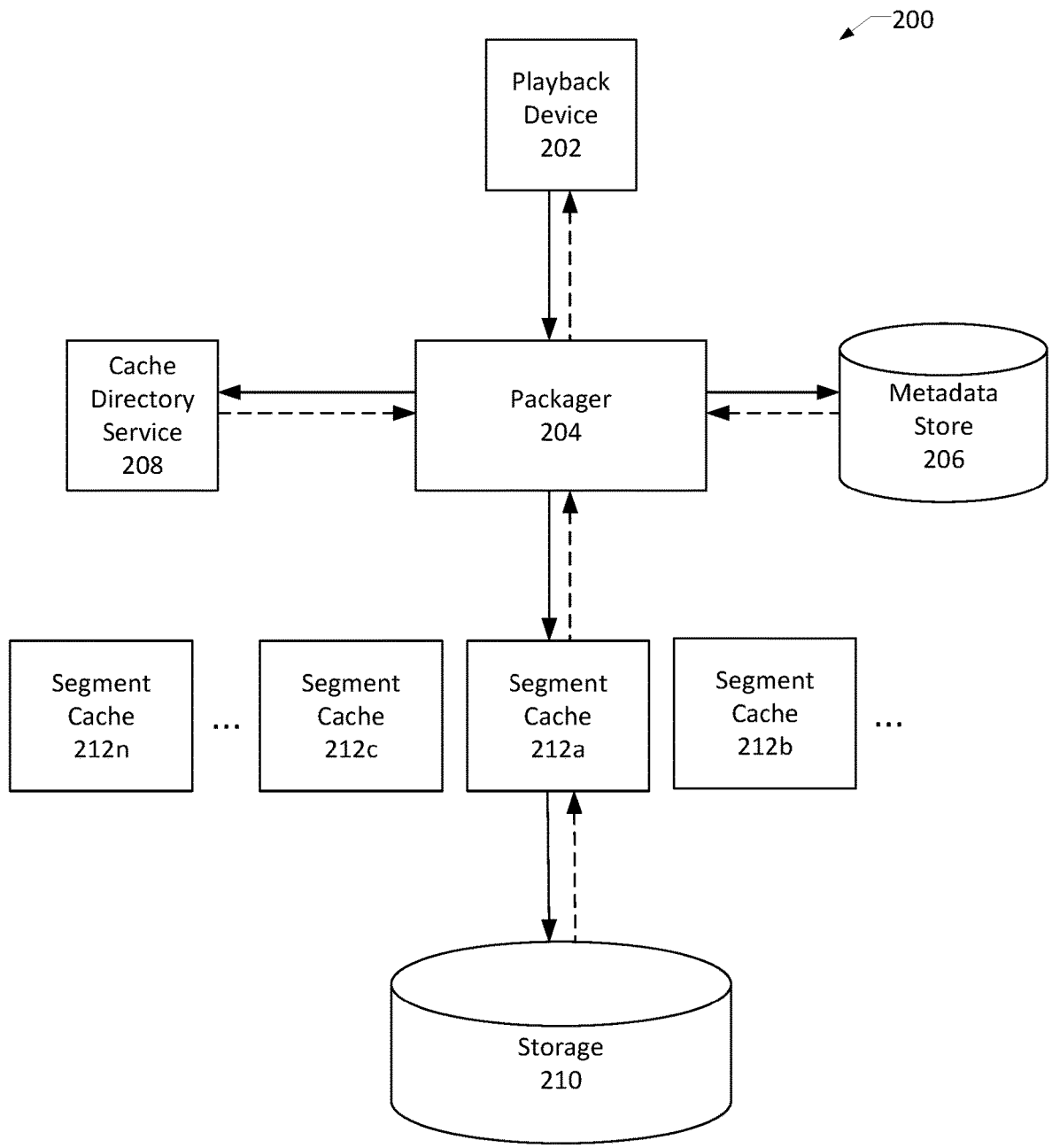
FIG. 2 shows an example system.

FIG. 2 shows an example system 200. The system 200 may comprise a cloud DVR system, a video-on-demand (VOD) system, or other system that delivers non-linear content to users, such as content items like that illustrated in FIG. 1. The system 200 may also deliver linear content to users. Each user may use one or more playback devices, such as the playback device 202, to consume (e.g., view, listen to, interact with, etc.) the content. The playback device 202 may be a set-top box (STB), a television, a desktop computer, a laptop computer, a smartphone, a tablet, a personal digital assistant, a media player, or any other computing device configured to present content to a user.

The system may further comprise a packager 204. The packager 204 may be configured to receive a request from a playback device, such as the playback device 202, for a content item or a segment of a content item. The packager 204 may be configured to generate a manifest associated with the content item. The manifest may be in the form of a file. Generally, a manifest file may contain information describing various aspects of the associated content item that may be useful for the playback device 202 to playback the content item and/or for the system 200 to retrieve the content item. For example, a manifest file may indicate each of the plurality of content segments, the playback duration of each segment, the number of segments, and/or the proper ordering of the segments necessary to effectuate a playback of the content item. A manifest file may comprise a network location (e.g., a hyper-text transfer protocol (HTTP) uniform resource locater (URL) link or other universal resource identifier (URI)) for each segment from which the segment may be downloaded, accessed, or retrieved. It will be appreciated that the network locations included within a manifest file may point to more than one different location or source. The manifest file associated with a content item may be provided to a playback device in response to a request from the playback device that indicates a desire to playback the content item. The playback device 202 may use the manifest file to determine the segments required to play the content item or a portion of the content item and subsequently to download the required segments using the network locations specified in the manifest file.

The system may further comprise a storage 210. The storage 210 may store content items that may be requested by playback devices, such as the playback device 202, for playback by users of the system. The stored content items may be content items available for playback as part of a video-on-demand (VOD) system. The stored content items may be content items recorded by users of playback devices, such as recorded content items of a cloud DVR system. The storage 210 may implement any digital storage technology suitable for storing content items. For example, the storage 210 may comprise one or more object store storage subsystems, a disk array, a JBOD (just a bunch of disks), or any other storage technology. The storage 210 may be configured to store and allow retrieval of large numbers of content items.

In the case of a cloud DVR system, a plurality of users may have chosen to record a same content item, such as a television program broadcast at a particular time. Due to legal and regulatory requirements, the storage 210 may store an individual copy of the recorded content item for each user who makes a personal copy, even though the recorded content item, such as a television program, may be virtually identical for each user. For example, if one hundred users of the cloud DVR system all record the same television program broadcast at a particular time, the storage 210 may store one hundred individual copies of the recorded content item—one for each user.

Figure 3:
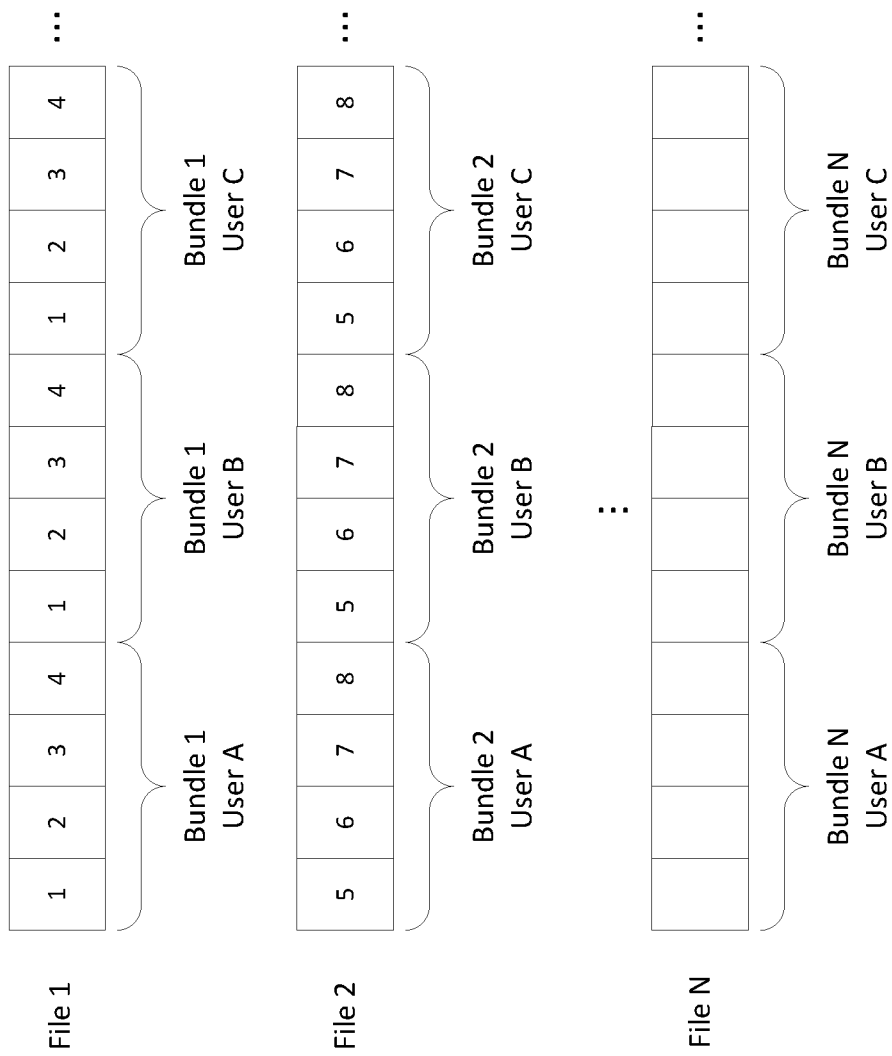
FIG. 3 illustrates an example storage format.

FIG. 3 illustrates an example storage format for storing a plurality of individual copies of a recorded content item, such as one for each user in the case of a cloud DVR system. As described above, each copy of a recorded content item may be divided into bundles of segments of the content item. In the example of FIG. 3, each bundle comprises four consecutive segments of a content item. In other implementations, each bundle may comprise more or less segments. A first bundle (e.g., segments 1-4) of each user's copy of the recorded content item may be stored together in a first file in storage 210. For example, as shown in FIG. 3, File 1 contains Bundle 1 of User A's copy of the content item, Bundle 1 of User B's copy of the content item, Bundle 1 of User C's copy of the content item, and so on. A second bundle (e.g., segments 5-8) of each user's copy of the recorded content item may be stored together in a second file in storage 210. For example, as shown in FIG. 3, File 2 contains Bundle 2 of User A's copy of the content item, Bundle 2 of User B's copy of the content item, Bundle 2 of User C's copy of the content item and so on. Each successive set of bundles of the respective users may be stored in similar files, such that there may be N such files for the N bundles of a particular recorded item, as shown in FIG. 3. As mentioned above, storing the content items in this format may facilitate more efficient storage of the content items. For example, by storing the segments of content items in bundles, a number of storage retrieval requests for the segments of a content item may be reduced. Storing the segments in bundles may also improve disk performance by allowing larger sequential writes and reads.

Referring again to FIG. 2, the system 200 may further comprise a metadata store 206. The metadata store 206 may store metadata associated with each recorded content item for which one or more copies may be stored in storage 210. The metadata may comprise a manifest file for each content item. The packager 204 may send a manifest file for a content item to the playback device 202 of a user in response to a request from the playback device 202 for playback of the content item. The manifest file may contain a URL or URI for each segment of the content item, and the playback device may use the URL or URI of each segment to send a request for the segment to the packager.

Each stored copy of a content item may have an associated identifier (ID) of the content item, such as a recording ID (e.g., recordingID=123). Each segment of the content item may have an associated segment ID (e.g., segmentID=2). In the case of a cloud DVR system, the recording ID may identify the particular version of the content item recorded (i.e., stored) for the particular user that made/requested the recording. The identifiers associated with a given segment may be part of the URL for the segment contained in the manifest file for the content item. The metadata store 206 may comprise a database that may be indexed by the content item identifier and/or the segment identifier. The metadata for a given content item may comprise information that the packager 204 may use to facilitate retrieval of a content item and its segments from the storage 210 as well as servicing of requests for content from playback devices, such as playback device 202. For example, the metadata may include, for each segment of a content item recorded for a particular user, an identifier of the bundle of the content item containing that segment of the content item recorded for that user. The metadata for the segment may also comprise an identifier of a file on the storage 210 containing the bundle that contains that segment. For example, with reference to FIG. 3, if a request is received by the packager 204 for segment 5 of the content item recorded for User A, the metadata for that segment may identify Bundle 2 of User A in File 2.

Referring again to FIG. 2, the system 200 may further comprise one or more segment caches 212a, 212b, 212c, . . . 212n. Each segment cache may be configured to cache one or more bundles of content item segments retrieved from the storage 210 in response to requests for the same. Some or all of the segment caches may be implemented on a same computing device, such as a server. Alternatively or in addition, some or all of the segment caches may be implemented on different computing devices, such as respective servers. Such a distributed segment cache facilitates servicing of large numbers of request for the segment bundles.

In the case of a bundle that has been stored in one of the segment caches, in order to ensure that requests for playback of successive segments of that same bundle are routed to the same cache instance of that bundle, a cache directory service 208 may be provided as part of the system 200. The cache directory service 208 may maintain information that identifies, for each bundle of a recorded content item that may be stored in one of the segment caches, an identifier of the particular segment cache presently storing an instance of that bundle. Alternatively, or in addition, the cache directory service 208 could implement a consistent hashing mechanism on the segment URL requiring no auxiliary metadata storage. Any other suitable mechanism for routing the requests may be employed. The cache directory service 208 may be used by the packager 204 to direct requests for a particular segment/bundle to the correct segment cache 212a, 212b, 212c, . . . 212n.

Figure 4:
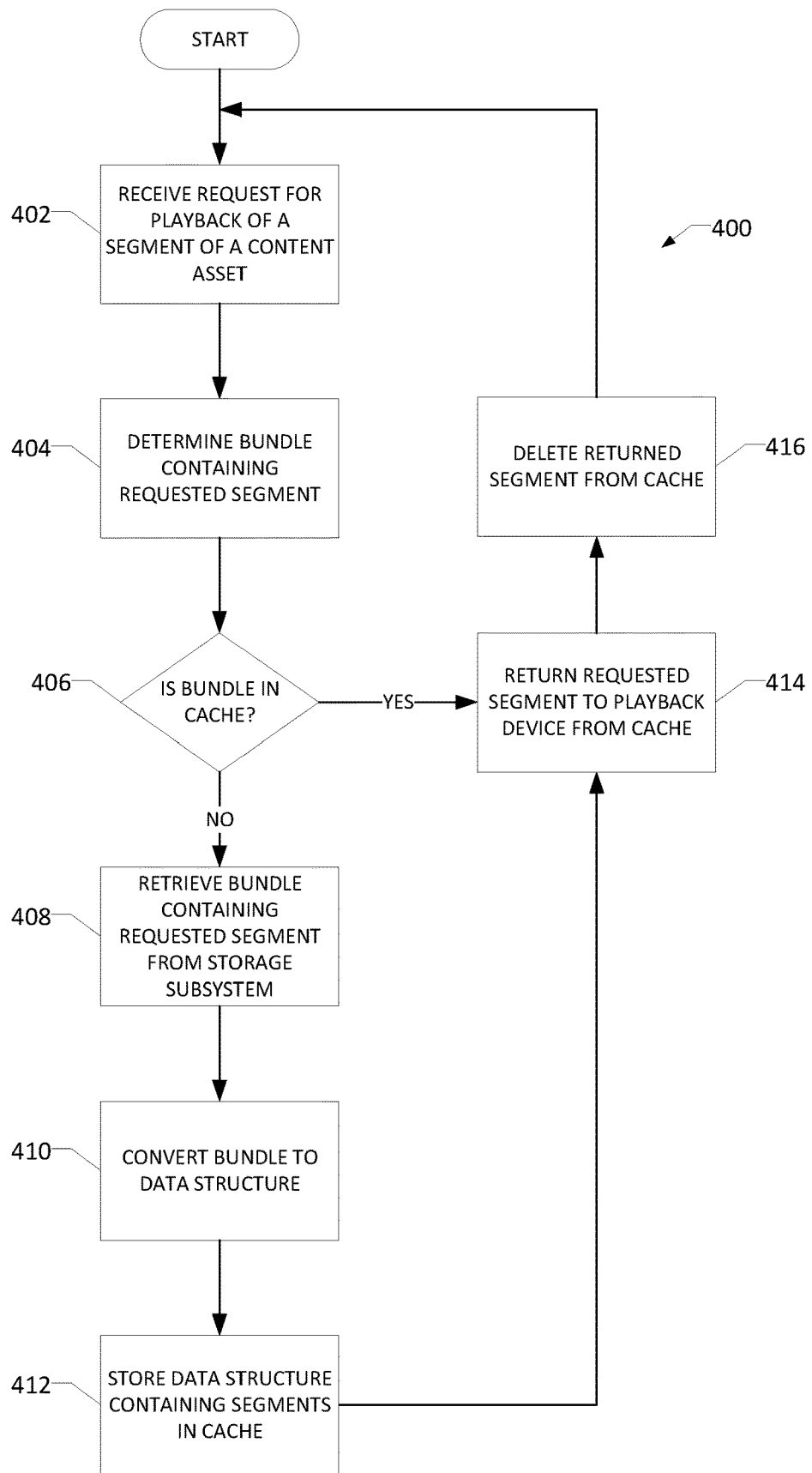
FIG. 4 illustrates an example method.

FIG. 4 illustrates an example method 400. The method 400 may be performed by a component of the system 200, such as the packager 204, as an example. The packager 204 may perform the method 400 in combination with other components of the system, such as for example, the metadata store 206, the cache directory service 208, the segment caches 212a, b, . . . n, and/or the storage 210.

In step 402, a request may be received from a playback device associated with a particular user, such as the playback device 202, for a segment of a stored content item, such as a content item the user recorded as part of a cloud DVR service. The request may comprise an identifier of the recorded content item and an identifier of the segment of the content item requested by the playback device. The identifier of the requested segment may be in the form of a URL or URI. The URL or URI may have been obtained by the playback device from a manifest associated with the content item. The manifest may have been provided to the playback device by the packager 204, such as in response to the first request for playback of a segment of the content item. As an example, the request may be in the form:

GET/<recordingID/<segmentID>

In step 404, a determination may be made, based on the request, which of the plurality of bundles of segments of the content item contains the requested segment. The determination may be made by the packager 204 using the metadata stored for the content item in metadata store 206. The metadata associated with the requested segment may identify the bundle of the content item. The metadata may also identify a file in which the identified bundle is stored on the storage 210 for the user that requested the recording of the content item. Based on the metadata identifying the bundle containing the requested segment and the file containing the determined bundle, the packager 204 may attempt to retrieve the requested segment in order to return the requested segment to the playback device.

In step 406, a determination may be made as to whether the bundle containing the requested segment is already stored in a segment cache, such as one of the segment caches 212a, 212b, . . . 212n. This determination may be facilitated by the cache directory service 208. As an example, the packager 204 may send a full path name for the requested segment to the cache directory service 208, including identifiers of the bundle containing the segment and the file containing the bundle. For example, the packager 204 may send a request of the form:

GET/<recordingID/<fileID>/<bundleID/<segmentID>

The cache directory service 208 may determine, from the full path name of the requested segment, one of the segment caches 212a, 212b, . . . 212n to which the request from the packager may be redirected. The cache directory service 208 may send a redirect message, such as a hypertext transport protocol (HTTP) 302 redirect message, to the packager 204, redirecting the packager 204 to the determined segment cache. In response to the message, the packager 204 may direct the request for the segment to the determined segment cache. In the case of a cache hit, i.e., it is determined that the segment cache contains an instance of the bundle containing the requested segment, the requested segment may be retrieved from the segment cache and returned to the packager 204. Alternatively, the cache directory service 208 may send the request from the packager 204 to the determined segment cache, retrieve the requested segment from the segment cache, and return the requested segment to the packager 204. In step 414, the packager 204 may send the requested segment to the playback device 202 in response to the request from the playback device 202.

If at step 406, it is determined that the bundle containing the requested segment does not reside in the segment cache identified by the cache directory service 208, i.e., there is a cache miss, the determined segment cache may send the request from the packager 204 to the storage 210. Alternatively, the packager 204 may send its request to the storage 210.

In step 408, the bundle containing the requested segment may be retrieved from the storage 210. The bundle containing the requested segment may be retrieved from the file containing the bundle. The retrieved bundle may be stored in the segment cache. The requested segment may be returned from the segment cache to the packager 204, which may then send the requested segment to the playback device 202 in step 414.

As shown in step 410, the retrieved bundle of segments containing the requested segment may be converted into a data structure that facilities immediate removal of the element containing a segment, after that segment has been retrieved from the cache, thereby freeing the memory for that segment. This may improve cache efficiency. The data structure may be stored in the segment cache at step 412.

Figure 5:
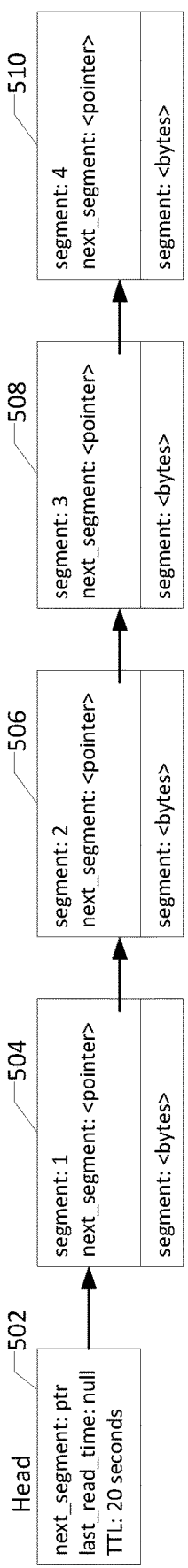
FIG. 5 illustrates an example linked list.

The data structure may comprise a linked list. Any other suitable data structure may be utilized. FIG. 5 illustrates an example of a linked list of segments of a retrieved bundle.

As shown in FIG. 5, the example linked list may comprises a head element 502, followed by one or more successive segments elements 504, 506, 508, 510. The head element 502 may comprise a pointer to the current head of the linked list (e.g., in the form "next_segment: ptr"). The head element 502 may further comprise an indication of a duration of time in which the linked list of segments of the cached bundle may reside in the cache after each segment read. The duration may be referred to herein as a time-to-live (TTL). For example, the TTL indicator may indicate a duration of 20 seconds. If that duration of time expires after the last read of a segment of the bundle, the linked list of segments may be deleted from the cache. To this end, the head element 502 may further comprise an indication of a last time in which a segment of the linked list was read, e.g., the last time a segment of the linked list was requested and returned to the packager 204 from the segment cache. The TTL may ensure that any disruption (pause, stop, network partition, etc.) to playback of a content item for the indicated duration does not keep unread segments in the segment cache. Thus, deletion of the linked list of segments at the expiration of the TTL duration may result in more efficient use of the segment cache(s).

Each of the segment elements 504, 506, 508, and 510 of the linked list may comprise a header followed by the data (e.g., bytes) of the segment itself. The header of a segment element may comprise an identifier of the segment contained in that element (e.g., in the form "segment: <segmentID>"). The header of a segment element may further comprise a pointer to the next segment element in the linked list (e.g., in the form "next_segment: <pointer>"). As an example, the linked list of FIG. 5 may be created upon retrieving a bundle from the storage 210 containing four consecutive segments of a content item, such as, for example, segments 1, 2, 3, and 4.

To facilitate the creation of the linked list, each file on the storage 210 containing the respective user copies of a same bundle, may further contain metadata that specifies, for each of the plurality of segments of the determined bundle, an end of segment byte offset within the bundle. The end of segment byte offset of a given segment, identifies the last byte of that segment within the bundle, i.e., where in the bundle that segment ends. For example, consider a bundle containing four consecutive segments 1, 2, 3, and 4. Segment 1 may comprise bytes 0 to 10000, segment 2 may comprise bytes 10001 to 90000, segment 3 may comprise bytes 90001 to 180001, and segment 4 may comprise bytes 180002 to 250002. In such an example, the end of segment offset metadata in the file containing each user's copy of this same bundle may be in the form:

x_seg_end: 10000,90000,180001,250002

That is, the end of segment byte offset metadata may specify, for each segment of the bundle, the byte offset of the last byte of that segment of the bundle. Because each of the user copies of the bundle within the file is identical, only one instance of the end of segment byte offset metadata may need to be stored in the file.

As mentioned above, the end of segment byte offset metadata facilitates the conversion of a retrieved bundle to a linked list of segments in step 410. The linked list of segments may be stored in the determined segment cache in step 412. A segment requested by the playback device 202, and hence the packager 204, may be returned from the segment cache to the packager 204, and the packager may send the requested segment to the playback device in step 414 in response to the request from the playback device.

In step 416, once a requested segment of a bundle has been returned from a segment cache, that requested segment may be deleted from the segment cache. The remaining segments of the bundle may continue to reside in the segment cache. In the event that the playback device sends another request for the next segment of the bundle, that request can be serviced from the segment cache, thus eliminating the need to retrieve again the same bundle from the storage 210. And, as each successive segment of the cached bundle is returned to the playback device from the segment cache, the returned segment may be deleted from the segment cache. This may facilitate more efficient use of the segment caches.

Figure 6:
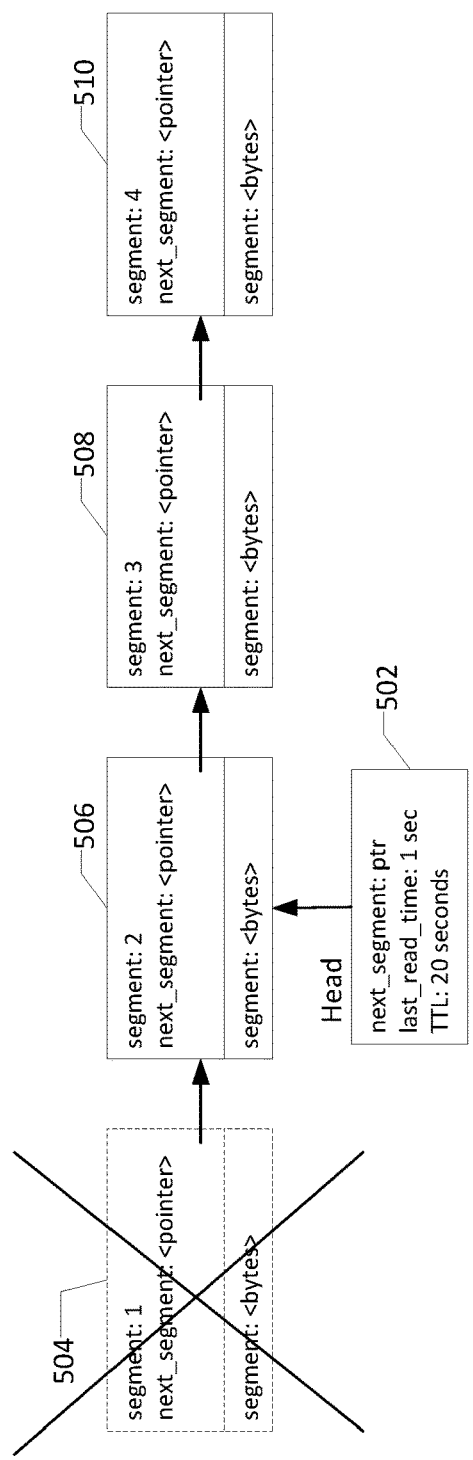
FIG. 6 illustrates another aspect of the linked list of FIG. 5.

FIG. 6 illustrates an example of the deletion of a segment from a segment cache after that segment has been returned to a playback device from the segment cache (e.g., in step 416). In this example, assume that the segment cache initially stored the linked list of segments illustrated in FIG. 5. Assume further that in response to a request from the playback device 202, the packager 204 has returned (i.e. sent) the first segment (e.g., segment 1) to the playback device after retrieval of that segment from the segment cache. As shown in FIG. 6, the segment element 504 containing the data (e.g., bytes) of that first segment has been deleted from the linked list of segments in the segment cache, and the head element 502 of the linked list has been advanced such that it now points to the next segment element 506 of the linked list containing the data of segment 2 of the cached bundle.

As mentioned above, cache efficiency may be further facilitated by deleting any remaining segments of a cached bundle if a time-to-live duration for the cached bundle has been reached (e.g., expired) after the last read of a segment from the cache. In the case of a bundle that has been converted to a linked list, as described above in connection with steps 410 and 412 of FIG. 4, an indication of the time-to-live duration may be stored in the head element 502 of the linked list.

A segment may be requested that is not the first segment in a bundle. In such instance, the requested segment may be deleted along with any segments that precede the requested segment in the bundle, after the requested segment is returned. Alternatively, the segments preceding the requested segment may not be deleted after the requested segment is returned. In such a case, deletion of the preceding segments may occur at or after expiration of the TTL duration.

Figure 7:
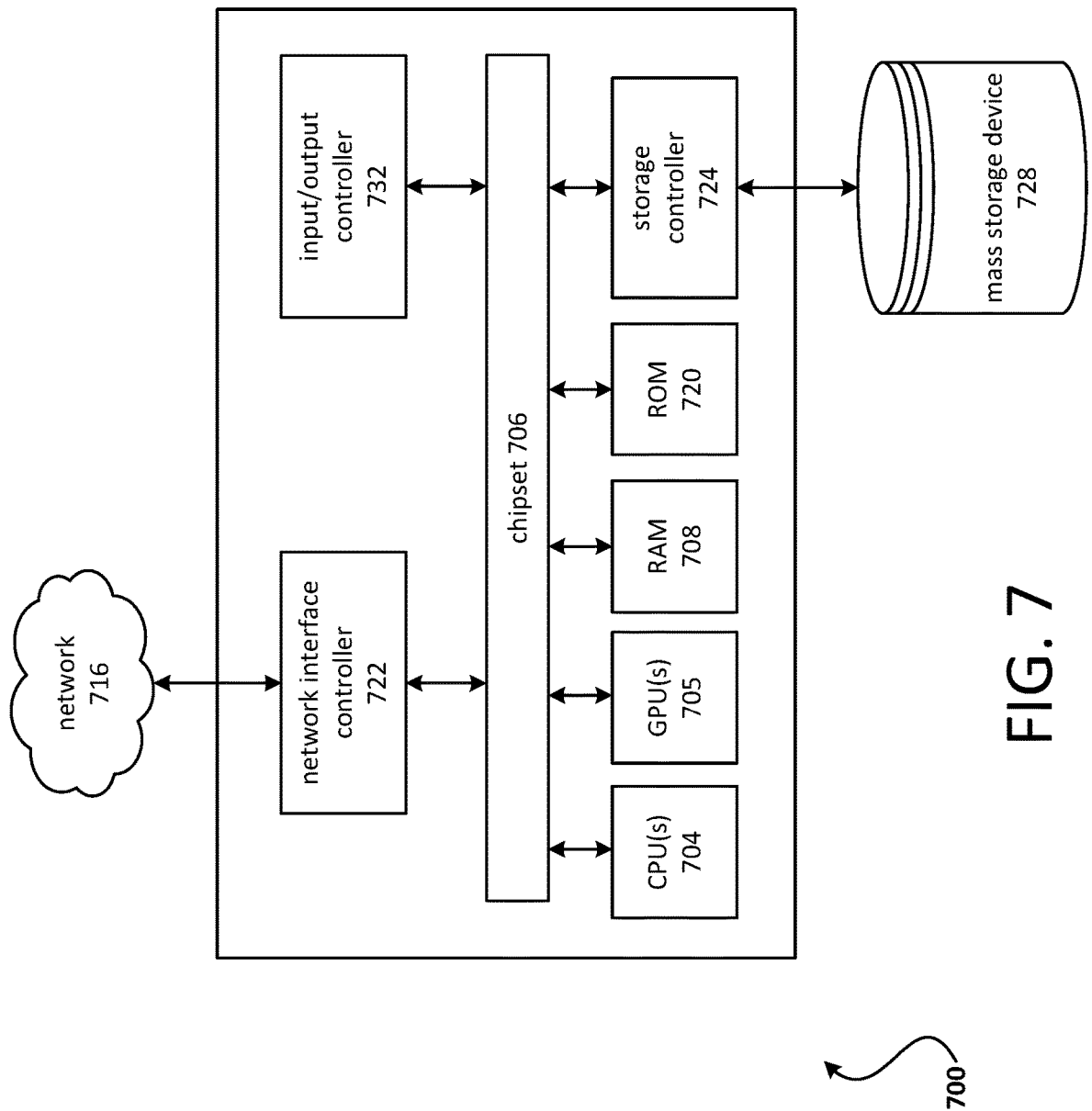
FIG. 7 illustrates an example computing device.

FIG. 7 depicts an example computing device that may be used to implement one or more of the components depicted in FIG. 2, such as the playback device 202, the packager 204, the cache directory service 208, the metadata store 206, the segment caches 212a, 212b, . . . 212n, and/or the storage 210. The computer architecture shown in FIG. 7 shows a conventional server computer, workstation, desktop computer, laptop, tablet, network appliance, PDA, e-reader, digital cellular phone, or other computing device, and may be utilized to execute any aspects of the methods described herein, such as to implement the methods described in relation to FIG. 4.

The computing device 700 may include a baseboard, or "motherboard," which is a printed circuit board to which a multitude of components or devices may be connected by way of a system bus or other electrical communication paths. One or more processors, such as central processing units (CPUs) 704, may operate in conjunction with a chipset 706. The one or more CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to generate more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a memory, such as a random access memory (RAM) 708, used as the main memory in the computing device 700. The chipset 706 may provide an interface to a computer-readable storage medium, such as a read-only memory (ROM) 820 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through the storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, non-transitory computer-readable storage media, and removable and non-removable non-transitory media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion. Computer-readable storage media, as that term is used herein, does not include signals.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also store, or otherwise be encoded with, computer-executable instructions, which, when executed by one or more of the processors 704, 705 of the computing device 700, may cause the methods described herein to be performed. Execution of such instructions may transform the computing device from a general-purpose computing system into a special-purpose computer capable of implementing the aspects described herein. These computer-executable instructions transform the computing device 700 by indicating how the CPU(s) 704 transition between states, as described herein.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and apparatus described herein are not limited to specific methods, specific components, or to particular implementations. It is also to be understood that the terminology used herein is for the purpose of describing various aspects only and is not intended to be limiting.

As used in the specification and the appended claims, the singular forms "a," "an," and "the" include plural referents unless the context clearly dictates otherwise. Ranges may be expressed herein as from "about" one particular value and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Example" means "an example of" and is not intended to convey an indication of a preferred or ideal embodiment. "Such as" is not used in a restrictive sense, but for explanatory purposes.

Components are described that may be used to perform the described methods, apparatus and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods, apparatus and systems described herein may take the form of an entirely hardware embodiment, an entirely software embodiment, or an embodiment combining software and hardware aspects. Furthermore, the methods and systems may take the form of a computer program product on a computer-readable storage medium having computer-executable instructions (e.g., computer software) stored on the storage medium.

The methods, apparatus, and systems are described above with reference to block diagrams and flowchart illustrations. It will be understood that each block of the block diagrams and flowchart illustrations, and combinations of blocks in the block diagrams and flowchart illustrations, respectively, may be implemented by computer executable instructions. These computer executable instructions may be loaded on a general-purpose computer, special-purpose computer, or other programmable data processing apparatus, such as the example computing device of FIG. 7, to produce a machine, such that the instructions which execute on the computer or other programmable data processing apparatus generate a means for implementing the functions specified in the flowchart block or blocks.

The various methods and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed. The example systems and components described herein may be configured differently than described. For example, elements may be added to, removed from, or rearranged compared to the described examples.

It will also be appreciated that various items are shown as being stored in memory or on storage while being used, and that these items or portions thereof may be transferred between memory and other storage devices for purposes of memory management and data integrity. Additionally or alternatively, in other embodiments, some or all of the software modules and/or systems may execute in memory on another device and communicate with the shown computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as example only.

The invention claimed is:

1. A method, comprising:
  receiving, from a user device, a request for a segment of a plurality of segments of a content item;
  determining, based on the request, which of a plurality of bundles of segments of the content item contains the requested segment;
  retrieving, from the storage, metadata associated with the determined bundle, wherein the metadata specifies, for each segment contained in the determined bundle, an end of segment location within the determined bundle;
  storing, in a cache memory, the determined bundle; and
  sending, to the user device, and based on the retrieved metadata, the requested segment of the segments of the determined bundle stored in the cache.

2. The method recited in claim 1, further comprising:
  deleting the requested segment of the segments of the determined bundle from the cache memory after sending the requested segment to the user device; and
  maintaining the remaining segments of the bundle in the cache memory.

3. The method recited in claim 1, further comprising:
  receiving, from the user device, another request for another segment of the segments of the determined bundle;
  determining, based on the another request, whether the determined bundle is still stored in the cache memory;
  retrieving, based on determining that the determined bundle is still stored in the cache memory, the another segment from the cache memory; and
  sending, to the user device, the another segment from the cache memory.

4. The method recited in claim 3, further comprising:
  deleting the another segment from the cache memory after sending the another segment to the user device.

5. The method of claim 1, further comprising:
  creating, in the cache memory, a data structure containing the segments of the determined bundle, wherein the data structure is created based on the retrieved metadata.

6. The method recited in claim 5, wherein the data structure facilitates removal of an element of the data structure containing one of the segments of the determined bundle.

7. The method recited in claim 5, wherein the data structure comprises a linked list.

8. The method of claim 1, wherein the end of segment location comprises an end of segment byte offset.

9. A method, comprising:
  receiving, from a user device, a request for a segment of a plurality of segments of a content item;
  determining, based on the request, which of a plurality of bundles of segments of the content item contains the requested segment, wherein for each bundle of the plurality of bundles of segments of the content item, a plurality of copies of the bundle is stored in a different one of a plurality of files on a storage, and wherein each copy of the bundle is associated with a different user;
  storing, in the cache memory, a linked list data structure containing the segments of the determined bundle, wherein each segment comprises an element of the linked list; and
  sending, to the user device, the requested segment of the segments of the determined bundle stored in the linked list data structure.

10. The method recited in claim 9, further comprising:
  deleting the requested segment of the segments of the determined bundle from the cache memory after sending the requested segment to the user device; and
  maintaining the remaining segments of the bundle in the cache memory.

11. The method recited in claim 9, further comprising:
  receiving, from the user device, another request for another segment of the segments of the determined bundle;
  determining, based on the another request, whether the determined bundle is still stored in the linked list data structure in the cache memory;
  retrieving, based on determining that the determined bundle is still stored in the linked list data structure in the cache memory, the another segment from the linked list data structure; and
  sending, to the user device, the another segment from the cache memory.

12. The method recited in claim 11, further comprising:
deleting the another segment from the linked list data structure in the cache memory after sending the another segment to the user device.

13. The method recited in claim 9, wherein the linked list data structure facilitates removal of an element of the data structure containing one of the segments of the determined bundle.

14. The method recited in claim 9, further comprising:
retrieving, from the storage, metadata associated with the determined bundle, wherein the metadata specifies, for each of the segments of the determined bundle, an end of segment location within the bundle; and
wherein the linked list data structure is created based on the retrieved metadata.

15. A computing device, comprising:
one or more processors; and
memory storing computer-executable instructions, which when executed by the one or more processors, cause the device to:
receive, from a user device, a request for a segment of a plurality of segments of a content item;
determine, based on the request, which of a plurality of bundles of segments of the content item contains the requested segment;
retrieve, from the storage, metadata associated with the determined bundle, wherein the metadata specifies, for each segment contained in the determined bundle, an end of segment location within the determined bundle;
store, in a cache memory, the determined bundle; and
send, to the user device, and based on the retrieved metadata, the requested segment of the segments of the determined bundle stored in the cache.

16. The computing device recited in claim 15, wherein the computer-executable instructions further cause the device to:
delete the requested segment of the segments of the determined bundle from the cache memory after sending the requested segment to the user device; and
maintain the remaining segments of the bundle in the cache memory.

17. The computing device recited in claim 15, wherein the computer-executable instructions further cause the device to:
receive, from the user device, another request for another segment of the segments of the determined bundle;
determine, based on the another request, whether the determined bundle is still stored in the cache memory;
retrieve, based on determining that the determined bundle is still stored in the cache memory, the another segment from the cache memory; and
send, to the user device, the another segment from the cache memory.

18. The computing device recited in claim 17, wherein the computer-executable instructions further cause the device to:
delete the another segment from the cache memory after sending the another segment to the user device.

19. The computing device of claim 15, wherein the computer-executable instructions further cause the device to:
create, in the cache memory, a data structure containing the segments of the determined bundle, wherein the data structure is created based on the retrieved metadata.

20. The computing device recited in claim 19, wherein the data structure facilitates removal of an element of the data structure containing one of the segments of the determined bundle.

21. The computing device recited in claim 19, wherein the data structure comprises a linked list.

22. A computing device, comprising:
one or more processors; and
memory storing computer-executable instructions, which when executed by the one or more processors, cause the device to:
receive, from a user device, a request for a segment of a plurality of segments of a content item;
determine, based on the request, which of a plurality of bundles of segments of the content item contains the requested segment, wherein for each bundle of the plurality of bundles of segments of the content item, a plurality of copies of the bundle is stored in a different one of a plurality of files on a storage, and wherein each copy of the bundle is associated with a different user;
store, in the cache memory, a linked list data structure containing the segments of the determined bundle, wherein each segment comprises an element of the linked list; and
send, to the user device, the requested segment of the segments of the determined bundle stored in the linked list data structure.

23. The computing device recited in claim 22, wherein the computer-executable instructions further cause the device to:
delete the requested segment of the segments of the determined bundle from the cache memory after sending the requested segment to the user device; and
maintain the remaining segments of the bundle in the cache memory.

24. The computing device recited in claim 22, wherein the computer-executable instructions further cause the device to:
receive, from the user device, another request for another segment of the segments of the determined bundle;
determine, based on the another request, whether the determined bundle is still stored in the linked list data structure in the cache memory;
retrieve, based on determining that the determined bundle is still stored in the linked list data structure in the cache memory, the another segment from the linked list data structure; and
send, to the user device, the another segment from the cache memory.

25. The computing device recited in claim 24, wherein the computer-executable instructions further cause the device to:
delete the another segment from the linked list data structure in the cache memory after sending the another segment to the user device.

26. The computing device recited in claim 22, wherein the linked list data structure facilitates removal of an element of the data structure containing one of the segments of the determined bundle.

27. The computing device recited in claim 22, wherein the computer-executable instructions further cause the device to:
retrieve, from the storage, metadata associated with the determined bundle, wherein the metadata specifies, for each of the segments of the determined bundle, an end of segment location within the bundle; and wherein the linked list data structure is created based on the retrieved metadata.

28. A non-transitory, computer-readable medium storing instructions that, when executed, cause:
   receiving, from a user device, a request for a segment of a plurality of segments of a content item;
   determining, based on the request, which of a plurality of bundles of segments of the content item contains the requested segment;
   retrieving, from the storage, metadata associated with the determined bundle, wherein the metadata specifies, for each segment contained in the determined bundle, an end of segment location within the determined bundle;
   storing, in a cache memory, the determined bundle; and
   sending, to the user device, and based on the retrieved metadata, the requested segment of the segments of the determined bundle stored in the cache.

29. The non-transitory, computer-readable medium recited in claim 28, wherein the instructions, when executed, further cause:
   deleting the requested segment of the segments of the determined bundle from the cache memory after sending the requested segment to the user device; and
   maintaining the remaining segments of the bundle in the cache memory.

30. The non-transitory, computer-readable medium recited in claim 28, wherein the instructions, when executed, further cause:
   receiving, from the user device, another request for another segment of the segments of the determined bundle;
   determining, based on the another request, whether the determined bundle is still stored in the cache memory;
   retrieving, based on determining that the determined bundle is still stored in the cache memory, the another segment from the cache memory; and
   sending, to the user device, the another segment from the cache memory.

31. The non-transitory, computer-readable medium recited in claim 30, wherein the instructions, when executed, further cause:
   deleting the another segment from the cache memory after sending the another segment to the user device.

32. The non-transitory, computer-readable medium recited in claim 28, wherein the instructions, when executed, further cause:
   creating, in the cache memory, a data structure containing the segments of the determined bundle, wherein the data structure is created based on the retrieved metadata.

33. The non-transitory, computer-readable medium recited in claim 32, wherein the data structure facilitates removal of an element of the data structure containing one of the segments of the determined bundle.

34. The non-transitory, computer-readable medium recited in claim 32, wherein the data structure comprises a linked list.

35. The non-transitory, computer-readable medium of claim 28, wherein the end of segment location comprises an end of segment byte offset.

36. A non-transitory, computer-readable medium storing instructions that, when executed, cause:
   receiving, from a user device, a request for a segment of a plurality of segments of a content item;
   determining, based on the request, which of a plurality of bundles of segments of the content item contains the requested segment, wherein for each bundle of the plurality of bundles of segments of the content item, a plurality of copies of the bundle is stored in a different one of a plurality of files on a storage, and wherein each copy of the bundle is associated with a different user;
   storing, in the cache memory, a linked list data structure containing the segments of the determined bundle, wherein each segment comprises an element of the linked list; and
   sending, to the user device, the requested segment of the segments of the determined bundle stored in the linked list data structure.

37. The non-transitory, computer-readable medium recited in claim 36, wherein the instructions, when executed, further cause:
   deleting the requested segment of the segments of the determined bundle from the cache memory after sending the requested segment to the user device; and
   maintaining the remaining segments of the bundle in the cache memory.

38. The non-transitory, computer-readable medium recited in claim 36, wherein the instructions, when executed, further cause:
   receiving, from the user device, another request for another segment of the segments of the determined bundle;
   determining, based on the another request, whether the determined bundle is still stored in the linked list data structure in the cache memory;
   retrieving, based on determining that the determined bundle is still stored in the linked list data structure in the cache memory, the another segment from the linked list data structure; and
   sending, to the user device, the another segment from the cache memory.

39. The non-transitory, computer-readable medium recited in claim 38, wherein the instructions, when executed, further cause:
   deleting the another segment from the linked list data structure in the cache memory after sending the another segment to the user device.

40. The non-transitory, computer-readable medium recited in claim 36, wherein the linked list data structure facilitates removal of an element of the data structure containing one of the segments of the determined bundle.

41. The non-transitory, computer-readable medium recited in claim 36, wherein the instructions, when executed, further cause:
   retrieving, from the storage, metadata associated with the determined bundle, wherein the metadata specifies, for each of the segments of the determined bundle, an end of segment location within the bundle; and
   wherein the linked list data structure is created based on the retrieved metadata.

* * * * *